United States Patent
Bogdanovic et al.

(10) Patent No.: US 10,237,180 B2
(45) Date of Patent: Mar. 19, 2019

(54) NETWORK ROUTING SYSTEMS AND TECHNIQUES

(71) Applicant: Volta Networks, Inc., Brookline, MA (US)

(72) Inventors: Ivan D. Bogdanovic, Brookline, MA (US); Marc Sune, Barcelona (ES)

(73) Assignee: Volta Networks, Inc., Brookline, MA (US)

( * ) Notice: Subject to any disclaimer, the term of this patent is extended or adjusted under 35 U.S.C. 154(b) by 0 days.

(21) Appl. No.: 15/361,333

(22) Filed: Nov. 25, 2016

(65) Prior Publication Data
US 2017/0171072 A1   Jun. 15, 2017

Related U.S. Application Data

(60) Provisional application No. 62/259,934, filed on Nov. 25, 2015.

(51) Int. Cl.
   *H04L 12/28* (2006.01)
   *H04L 12/741* (2013.01)
   (Continued)

(52) U.S. Cl.
   CPC .............. *H04L 45/74* (2013.01); *H04L 45/04* (2013.01); *H04L 61/35* (2013.01); *H04L 69/324* (2013.01); *H04L 69/325* (2013.01)

(58) Field of Classification Search
   None
   See application file for complete search history.

(56) References Cited

U.S. PATENT DOCUMENTS

| | | | |
|---|---|---|---|
| 6,070,187 A * | 5/2000 | Subramaniam | H04L 29/12216 709/220 |
| 6,247,058 B1 * | 6/2001 | Miller | H04L 47/10 370/418 |

(Continued)

FOREIGN PATENT DOCUMENTS

| | | |
|---|---|---|
| EP | 0800329 A2 | 10/1997 |
| EP | 1650911 A2 | 4/2006 |

OTHER PUBLICATIONS

International Search Report and Written Opinion for International Application No. PCT/US2016/063788 dated Mar. 3, 2017 (9 pages).

(Continued)

*Primary Examiner* — Phirin Sam
(74) *Attorney, Agent, or Firm* — Goodwin Procter LLP

(57) ABSTRACT

A system for hierarchical topological addressing and hierarchical recursive routing in a network includes routing devices organized in a hierarchical topology forming a routing layer including levels. The levels include first and second levels including first and second subsets of the routing devices, respectively. Each routing device in the first level is directly connected to endpoint modules and to routing devices in the second level. Each routing device has a hierarchical address based on a location of the routing device within the hierarchical topology. Each routing device performs recursive one-hop routing to route packets through the network. Performing recursive one-hop routing on a particular packet includes: selecting a network port based on a destination address of the packet, wherein the destination address is a hierarchical address of a second routing device in the first level, and forwarding the packet to a routing device directly connected to the selected network port.

21 Claims, 7 Drawing Sheets

(51) Int. Cl.
*H04L 12/715* (2013.01)
*H04L 29/12* (2006.01)
*H04L 29/08* (2006.01)

(56) References Cited

U.S. PATENT DOCUMENTS

| | | | |
|---|---|---|---|
| 8,339,959 B1 | 12/2012 | Moisand et al. | |
| 2001/0032271 A1* | 10/2001 | Allen | H04L 45/00 709/239 |
| 2004/0073659 A1 | 4/2004 | Rajsic et al. | |
| 2006/0229090 A1* | 10/2006 | LaDue | H04W 84/04 455/507 |
| 2008/0043614 A1* | 2/2008 | Soliman | H04W 8/065 370/208 |
| 2009/0040987 A1* | 2/2009 | Hirano | H04L 29/12264 370/338 |
| 2013/0010788 A1* | 1/2013 | Hamilton | H04L 45/04 370/389 |
| 2014/0108597 A1* | 4/2014 | Donley | H04L 61/2015 709/217 |
| 2015/0263952 A1* | 9/2015 | Ganichev | H04L 45/745 370/389 |
| 2017/0063633 A1* | 3/2017 | Goliya | H04L 41/12 |
| 2017/0163532 A1* | 6/2017 | Tubaltsev | H04L 45/74 |

OTHER PUBLICATIONS

R.N. Mysore et al., PortLand: A Scalable Fault-Tolerant Layer 2 Data Center Network Fabric, In Proceedings of the ACM SIGCOMM 2009 Conference on Data Communication, Aug. 2009, 12 pages.
R.N. Mysore et al., PortLand: A Scalable Fault-Tolerant Layer 2 Data Center Network Fabric, Jun. 2010, 25 pages. Available at https://www.cct.lsu.edu/~xuelin/datacenter/PortLand.pptx. Last accessed on Mar. 30, 2017.

* cited by examiner

NETWORK ROUTING SYSTEMS AND TECHNIQUES

CROSS-REFERENCE TO RELATED APPLICATION(S)

This application claims priority to and the benefit of U.S. Provisional Patent Application Ser. No. 62/259,934, filed on Nov. 25, 2015, which is hereby incorporated by reference herein in its entirety.

FIELD OF INVENTION

The present disclosure relates generally to techniques for improving network routing. Some embodiments described herein relate specifically to using single hop routing with temporary node addresses to manage intra-node communications.

BACKGROUND

Current Internet architecture is built around layers of different functions, including a "network layer" which provides a technology-independent abstraction on top of a large set of autonomous, heterogeneous networks. The Internet Protocol (IP) is one mechanism for achieving such an abstraction. However, limitations of the Internet Protocol's "best-effort" service model have prevented the Internet from effectively scaling to meet new requirements, such as security, manageability, wireless networking, mobility, and others.

SUMMARY OF THE INVENTION

One shortcoming of the current Internet architecture is that it exposes actual addresses to endpoint modules (e.g., endpoint devices such as servers or client devices; applications executing on endpoint devices, such as virtual machines; etc.) Exposing the actual addresses (e.g., IP addresses) of endpoint modules Internet-wide tends to inhibit the mobility of those modules. For example, a client using a voice-over-IP (VoIP) application that binds to an IP address provided by a cable operator A generally cannot move outside cable operator A's subnet (to which the IP address is assigned) without disrupting the network address registration and application connectivity.

Another issue with the current Internet architecture is that it artificially isolates functions of the same scope by splitting transport and routing/relaying into two separate layers, and artificially limiting the number of layers, which tends to cause growth of routing tables. This issue is especially problematic in datacenter and mobile networks, where large amounts of traffic are forwarded to network devices capable of holding such large routing tables, just to be sent back into the network via hairpin connections. This scenario, in which traffic comes from one source into the network device (e.g., router) and makes a U-turn and goes back the same way it came, is quite common and highly inefficient.

The inventors have recognized and appreciated that the performance of the Internet (or portions thereof, such as datacenters) can be enhanced by using hierarchical topological addressing and recursive routing in one or more layers encapsulated by (lower than) the "network layer" at which the Internet Protocol resides. Using hierarchical topological addressing and recursive routing below the network layer can lead to increased mobility of endpoint modules and reduced size of routing tables, while maintaining compatibility with other portions of the Internet that retain the current Internet architecture.

According to an aspect of the present disclosure, a system for hierarchical topological addressing and hierarchical recursive routing in a network may include a plurality of routing devices organized in a hierarchical topology, the topology forming a routing layer including a plurality of levels, the levels including a first level and a second level, the first level including a first subset of the routing devices, the second level including a second subset of the routing devices, each routing device in the first level being directly connected to one or more endpoint modules and to one or more routing devices in the second level, each routing device in the hierarchical topology having a hierarchical address based on a location of the respective routing device within the hierarchical topology. Each of the routing devices in the hierarchical topology is operable to perform recursive one-hop routing to route packets through the network, and a first routing device performing the recursive one-hop routing on a particular packet includes: selecting a network port of the first routing device based on at least a prefix of a destination address of the packet, wherein the destination address is a hierarchical address of a second routing device in the first level, and forwarding the packet to a routing device directly connected to the selected network port.

In some embodiments, the routing layer is below a network layer in a network protocol stack. In some embodiments, the network layer is an Internet Protocol (IP) layer. In some embodiments, the endpoint modules include a first endpoint module operable to establish a network connection with a second endpoint module in the network layer, and packets routed between the first and second endpoint modules are routed through the network via the recursive one-hop routing. In some embodiments, the first and second endpoint modules establish the network connection in the network layer using a first unique network identifier (ID) of the first endpoint module and a second unique network identifier (ID) of the second endpoint module. In some embodiments, a particular routing device R1 in the first level is directly connected to the first endpoint module prior to the network connection being established, the particular routing device R1 assigns a hierarchical address to the first endpoint module prior to the network connection being established, a particular routing device R2 changes the hierarchical address of the first endpoint module after the network connection is established, and the network maintains the network connection without interruption before and after the change in the hierarchical address of the first endpoint module.

In some embodiments, the system further includes a gateway device operable to route packets between the network and one or more external networks, wherein the gateway device uses unique network identifiers (IDs) in the network layer to route the packets. In some embodiments, the unique network IDs are Internet Protocol (IP) addresses and/or media access control (MAC) addresses. In some embodiments, each routing device in the hierarchical topology implements a network forwarding plane and communicates with one or more remote network routing planes. In some embodiments, each routing device further communicates with one or more remote network service planes.

In some embodiments, the routing devices in the hierarchical topology autonomically reassign the hierarchical addresses to themselves in response to a change in the hierarchical topology of the routing devices.

According to another aspect of the present disclosure, a method for hierarchical topological addressing and hierarchical recursive routing in a network is provided. The network includes a plurality of routing devices organized in a hierarchical topology. The topology forms a routing layer including a plurality of levels including a first level and a second level. The first level includes a first subset of the routing devices, and the second level includes a second subset of the routing devices. Each routing device in the first level is directly connected to one or more endpoint modules and to one or more routing devices in the second level. Each routing device in the hierarchical topology has a hierarchical address based on a location of the respective routing device within the hierarchical topology, and each of the routing devices in the hierarchical topology is operable to perform recursive one-hop routing to route packets through the network. The method includes performing, by a first routing device, recursive one-hop routing on a particular packet, including: selecting a network port of the first routing device based on at least a prefix of a destination address of the packet, wherein the destination address is a hierarchical address of a second routing device in the first level, and forwarding the packet to a routing device directly connected to the selected network port.

In some embodiments, the routing layer is below a network layer in a network protocol stack. In some embodiments, the network layer is an Internet Protocol (IP) layer. In some embodiments, the endpoint modules include a first endpoint module operable to establish a network connection with a second endpoint module in the network layer, and packets routed between the first and second endpoint modules are routed through the network via the recursive one-hop routing. In some embodiments, the first and second endpoint modules establish the network connection in the network layer using a first unique network identifier (ID) of the first endpoint module and a second unique network identifier (ID) of the second endpoint module. In some embodiments, a particular routing device R1 in the first level is directly connected to the first endpoint module prior to the network connection being established, the particular routing device R1 assigns a hierarchical address to the first endpoint module prior to the network connection being established, a particular routing device R2 changes the hierarchical address of the first endpoint module after the network connection is established, and the network maintains the network connection without interruption before and after the change in the hierarchical address of the first endpoint module.

In some embodiments, the network further includes a gateway device operable to route packets between the network and one or more external networks, and the gateway device uses unique network identifiers (IDs) in the network layer to route the packets. In some embodiments, the unique network IDs are Internet Protocol (IP) addresses and/or media access control (MAC) addresses. In some embodiments, each routing device in the hierarchical topology implements a network forwarding plane and communicates with one or more remote network routing planes. In some embodiments, each routing device further communicates with one or more remote network service planes.

In some embodiments, the routing devices in the hierarchical topology autonomically reassign the hierarchical addresses to themselves in response to a change in the hierarchical topology of the routing devices.

The details of one or more embodiments of the subject matter described in this specification are set forth in the accompanying drawings and the description below. Other features, aspects, and advantages of the subject matter will become apparent from the description, the drawings, and the claims. The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
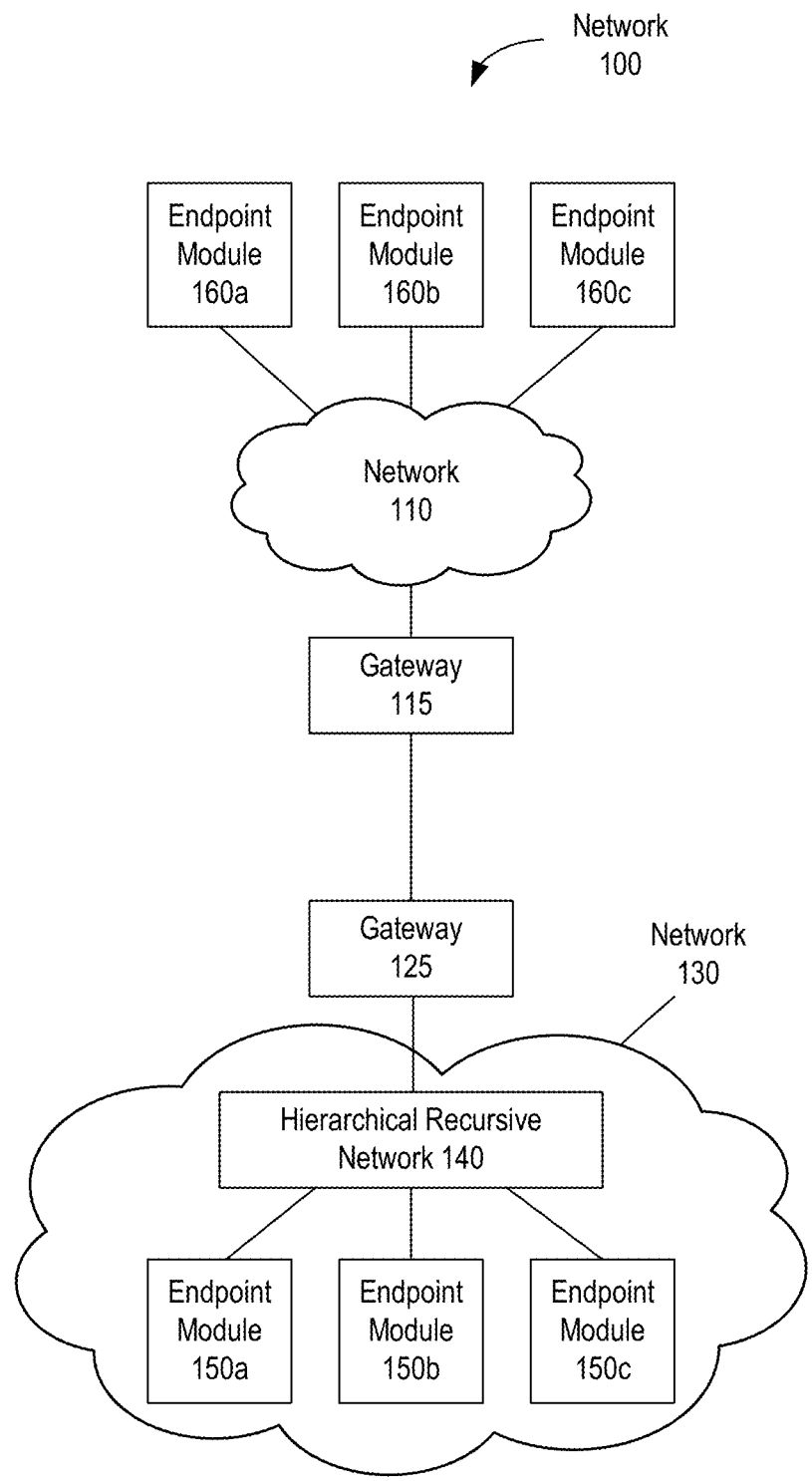
FIG. 1 is a block diagram of a network, according to some embodiments.

Referring to FIG. 1, a network 100 may include networks 110 and 130, which are communicatively coupled via gateways 115 and 125. The network 130 includes a hierarchical recursive network (HRN) 140 and endpoint modules 150 connected to the HRN 140. In some embodiments, the network 130 also includes the gateway 125. Features of some embodiments of the HRN 140 are described below, including suitable topologies of the HRN and routing techniques suitable for use within the HRN. In addition, endpoint modules 160 are coupled to network 110 and can communicate with the endpoint modules 150 via the network 110, the gateways (115, 125), and the HRN 140.

An endpoint module (150, 160) may be an endpoint device (e.g., a server computer, laptop computer, desktop computer, tablet computer, smartphone, etc.) or an application executing on an endpoint device (e.g., a virtual machine). Some embodiments of endpoint devices are described in further detail below. Each endpoint module may be assigned at least one unique network identifier ("network ID"), for example, an Internet Protocol (IP) address, a media access control (MAC) address, etc.

The network 110 may include one or more communication networks of any suitable type. Some examples of communication networks include a local area network ("LAN"), a wide area network ("WAN"), e.g., the Internet (or a portion thereof), etc. Communication networks may include wired and/or wireless networks. The network 110 may perform routing using any suitable routing techniques (e.g., link-state routing, distance vector routing, etc.). In some embodiments, the network 110 routes data packets based on the network IDs of the endpoint modules to which the data packets are addressed. As discussed above, performing routing based on the unique network IDs of the endpoint modules can lead to loss of connectivity when mobile endpoint modules (150, 160) change locations, and can also lead to very large routing tables and associated routing inefficiencies.

The gateways (115, 125) may route packets between networks (e.g., network 110 and network 130) based on the network IDs of the endpoint modules to which the packets are addressed. When gateway 115 receives a packet addressed to the network ID of one of the endpoint modules 160, the gateway 115 forwards the packet to the network 110 for routing to that endpoint module 160. When gateway 115 receives a packet addressed to the network ID of one of the endpoint modules 150, the gateway 115 forwards the packet to (or toward) the gateway 125 for routing to the endpoint module 150 via the hierarchical recursive network 140. When gateway 125 receives a packet addressed to the network ID of one of the endpoint modules 150, the gateway 125 forwards the packet to the HRN 140 for routing to that endpoint module 150. When gateway 125 receives a packet addressed to the network ID of one of the endpoint modules 160, the gateway 125 forwards the packet to (or toward) the gateway 115 for routing to the endpoint module 160 via the network 110. An example implementation of a gateway is described below with reference to FIGS. 6 and 7.

In the hierarchical recursive network 140, network devices (e.g., routers) are physically organized in a hierarchical topology (e.g., a tree) and are assigned hierarchical addresses corresponding to their locations within the topology. The network devices may autonomically assign the hierarchical addresses to themselves, and/or the hierarchical addresses may be assigned to the network devices by users (e.g., network administrators). Within the HRN 140, the network devices can use recursive routing protocols. In some embodiments, the routing protocol is implemented using an existing protocol, such as IS-IS. Using the recursive routing protocols, core routers (e.g., routers that are not directly connected to endpoint devices 150) can determine how to forward packets within the HRN 140 based on prefixes of the packets' destination addresses, and edge routers (e.g., routers that are directly connected to endpoint devices 150) can determine how to forward packets to core routers based on prefixes of the packets' destination addresses. When a recursive routing protocol is used, only the edge router connected to a particular endpoint module maintains a routing table entry for the address of that endpoint module. Thus, prefix-based recursive routing can greatly reduce the sizes of the routing tables maintained by the network devices in the HRN 140.

In the hierarchical recursive network 140, the edge routers can assign hierarchical addresses to the endpoint modules, and a network registrar can maintain a mapping between the unique network IDs of the endpoint modules and their corresponding hierarchical addresses. The network registrar can be centralized or distributed. When an endpoint module physically moves to a different location in the network, the module can maintain its unique network ID but receive a new hierarchical address from the network. Thus, connectivity in the network layer can be maintained as endpoint modules move, thereby facilitating increased mobility of the endpoint modules.

Figure 2:
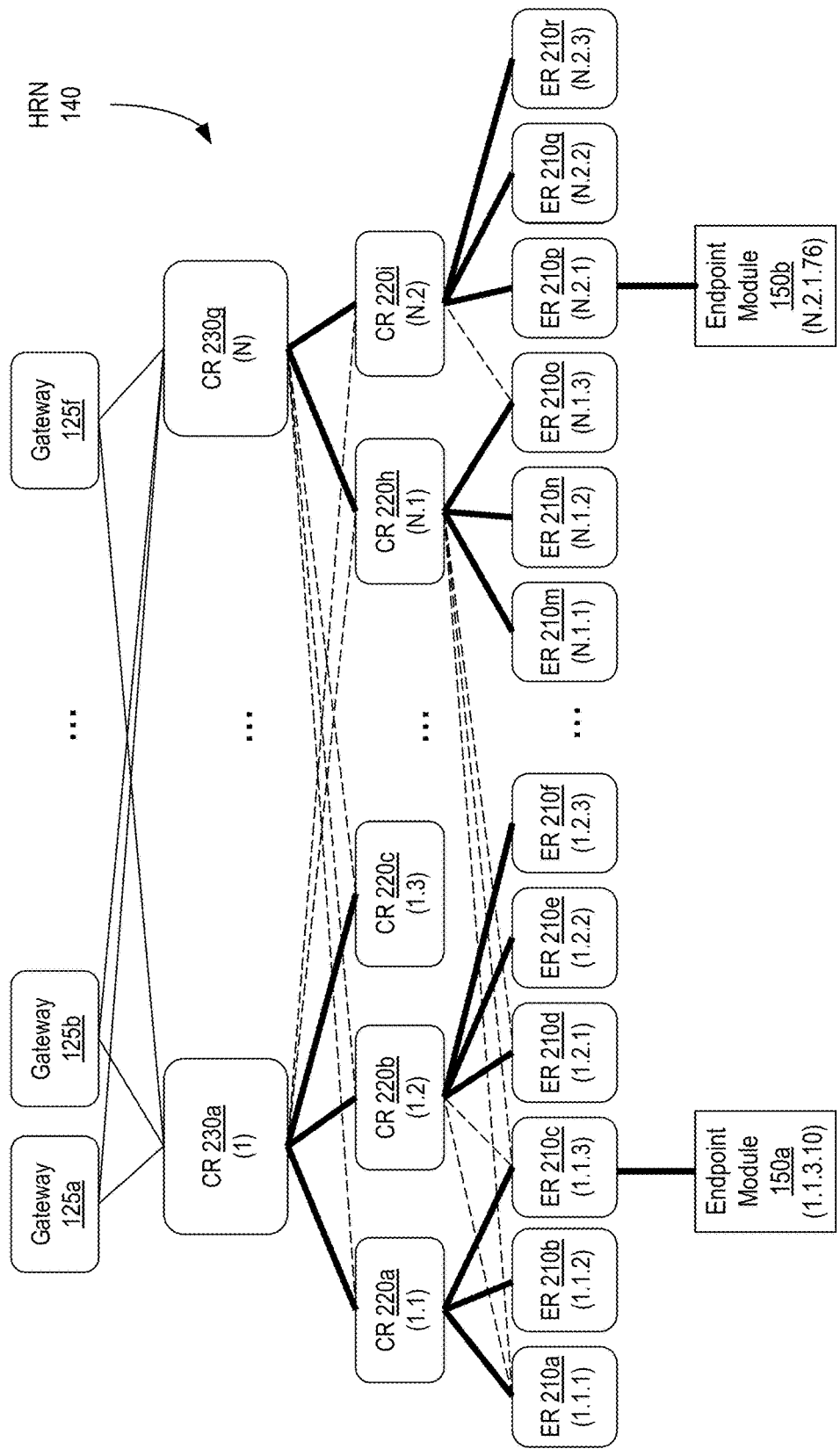
FIG. 2 is a block diagram of a hierarchical recursive network, according to some embodiments.

Some implementations of hierarchical recursive networks 140 are described below with reference to FIGS. 2-5. In the example of FIG. 2, the network 140 has a hierarchical topology (in particular, a tree topology), with the network devices (e.g., routing devices) organized in three levels. The first (lowest) level includes the edge routers ("ER") 210. Each edge router 210 may be connected to many endpoint modules 150, though, in the example of FIG. 2, only two endpoint modules 150a and 150b are shown. The second (intermediate) level includes the core routers ("CR") 220. Each of the core routers 220 in the second level may be connected to one or more edge routers 210 in the first level. The third (highest) level includes the core routers ("CR") 230. Each of the core routers 230 in the third level may be connected to one or more core routers 220 in the second level and to one or more gateways 125.

In the example of FIG. 2, the network devices (210, 220, 230) are not only organized in a hierarchical topology, but also assigned hierarchical addresses corresponding to their locations within the topology. For example, edge router 210c is assigned address 1.1.3, and all the endpoint modules 150 connected to edge router 210c are assigned addresses with a prefix of 1.1.3, matching the address of the edge router 210c. Likewise, core router 220a is assigned address 1.1, and all edge routers 210 assigned addresses with a prefix of 1.1 (i.e., ERs 210a, 210b, and 210c) are connected to CR 220a. Furthermore, core router 230a is assigned address 1, and all core routers 220 assigned addresses with a prefix of 1 (i.e., CRs 220a, 220b, and 220c) are connected to CR 230a. (In the example of FIG. 2, some of the edge routers 210 in the first level are connected to more than one core router 220 in the second level, and some of the core routers 220 in the second level are connected to more than one core router 230 in the third level. These redundant links within the network 140 can facilitate fault tolerance and load balancing. In addition, these redundant links do not interfere with the hierarchical topology of the network 140, nor do they interfere with the network's hierarchical addressing scheme.)

With the network devices 210-230 and the endpoint modules 150 organized in a hierarchical topology with hierarchical addresses corresponding to their locations in the topology, the network devices can efficiently route data packets through the network 140 using recursive one-hop routing. Within the network 140, a recursive routing protocol may be characterized by the following conditions:

(1) With the exception of the task of forwarding a local packet from a particular edge router 210 to an endpoint module 150 that is connected to that edge router, each network device 210-230 can forward each packet to the next hop in its routing path based on a prefix of the address of the endpoint module 150 to which the packet is being routed.

(2) The edge router 210 connected to an endpoint module 150 maintains a routing table entry for the full hierarchical address of that endpoint module 150, but no other edge router 210 in the network 140 is required to maintain a routing table entry for the full hierarchical address of that endpoint module 150.

An example of a registration operation performed by the network 140 is now described. In one embodiment, the hierarchical address of an endpoint module 150 is maintained by a registrar of the network 140 as a temporary alias. To connect to the network 140, the endpoint module 150 registers with the network registrar via the edge router 210 to which the endpoint module 150 is connected, and the registration information (e.g., the endpoint module's temporary alias (hierarchical address) and unique network ID) is distributed to other network devices that provide the same registration service. For example, to connect to the network 140, the endpoint module 150a registers with the edge router 210c, which has an address of 1.1.3. The registrar assigns the endpoint module 150a a temporary alias (hierarchical address) that complies with the hierarchical addressing scheme, i.e., a hierarchical address that includes the address of the edge router 210c as a prefix. In the example of FIG. 2, the hierarchical address assigned to the endpoint module 150a is 1.1.3.10.

In the foregoing example of registration, the endpoint module 150a registers with a single edge router 210c. In some embodiments, endpoint modules 150 can register with one or more edge routers 210. Redundant registration and connection of the endpoint modules 150 to multiple edge routers can increase the network's resilience, and may also facilitate load balancing. In scenarios in which an endpoint module 150 registers with multiple edge routers 210, the endpoint module may be assigned multiple unique network IDs (one for each registration) and multiple hierarchical addresses (one for each edge router).

An example of a routing operation performed by the network 140 is now described. Referring to FIG. 2, endpoint module 150b has been assigned address N.2.1.76 and is connected to edge router 210p, which has been assigned address N.2.1. To initiate the transmission of a packet to endpoint module 150a, endpoint module 150b addresses a the network layer packet $P_{NL}$ to endpoint module 150a's unique network ID, and forwards the packet to edge router 210p at the network layer. Edge router 210p queries the registrar for the location of endpoint module 150a (e.g., the address of the edge router 210 to which the endpoint module 150a is connected). Edge router 210p receives a response from the registrar, indicating that endpoint module 150a is connected to the edge router (210c) with address 1.1.3.

Continuing the routing example, the edge router 210p checks its routing table for entries matching the packet's destination address 1.1.3. In this case, the only route from edge router 210p to any address beginning with the prefix "1" is through the core router 220i. Thus, the packet's destination address "1.1.3" matches an entry "1.x.x" in the edge router's routing table, and the edge router 210p forwards the packet to core router 220i via the port corresponding to the matching table entry.

Continuing the routing example, the core router 220i checks its routing table for entries matching the packet's destination address 1.1.3. In this case, address 1.1.3 is reachable via core routers 220a, 220b, and 220c, so the routing table may include an entry "1.1.x" corresponding to core router 220a, an entry "1.x.x" corresponding to core router 1.2, and another entry "1.x.x" corresponding to core router 1.3. The core router 220i may use any suitable technique to select among the matching entries (e.g., a routing metric, equal cost multipath selection, etc.). For purposes of this example, the core router 220i selects the table entry "1.1.x" because it matches the longest prefix portion of the destination address 1.1.3, and forwards the packet to core router 220a.

Continuing the routing example, the core router 220a checks its routing table for entries matching the packet's destination address 1.1.3. In this case, address 1.1.3 is reachable via edge router 210c and via core router 230a. As discussed above, the core router 220i may use any suitable technique to select among the matching entries. For purposes of this example, the core router 220a selects the table entry "1.1.3" because it matches the entire destination address 1.1.3, and forwards the packet to edge router 210c.

Continuing the routing example, the packet has reached the edge router (210c) to which the endpoint module 150a is connected. After determining that the destination address of the packet matches the address of the edge router 210c, the edge router 210c checks with the registrar to determine whether a temporal alias (hierarchical address) has already been assigned to the unique network ID of the endpoint module 150a. As described above, the registrar has assigned temporal alias 1.1.3.10 to the endpoint module 150a. Thus, the edge router checks its routing table for an entry matching the endpoint module's temporal alias, and forwards the packet to endpoint module 150a using the information in the matching table entry.

As the foregoing example demonstrates, within the network 140, the unique network ID of each endpoint module has only local meaning to the edge router to which the endpoint module is connected. In addition, any response packet from endpoint module 150a to endpoint module 150b can be returned using the same recursive hop-by-hop routing as the received packet. Furthermore, none of the network devices need to have an entry for the full address of the endpoint module, only for the next hop. In addition, the number of layers in the network 140 is practically unlimited and can be artificially determined based on suitable criteria, thus providing flexibility in network design.

An example of a network reorganization operation performed by the network 140 is now described. When a new network device or routing layer is added to the network 140, the network autonomically readdresses the network devices, as doing so does not disrupt any connectivity. This architecture provides mobility for endpoint modules (e.g., services, hosts, etc.) in the network, as the host connectivity is not bound by network layer addressing and enforces security, as different intents can be enforced at different points in the network without adding any specialized network devices such as firewalls, etc.

Some examples have been described in which all routing devices in the network 140 are in a single routing layer governed by the same routing protocol, even though the routing devices are organized in different levels of a hierarchical topology. In some embodiments, the different routing devices in the network 140 may be included in different routing layers, which may be governed by different routing protocols.

Figure 3:
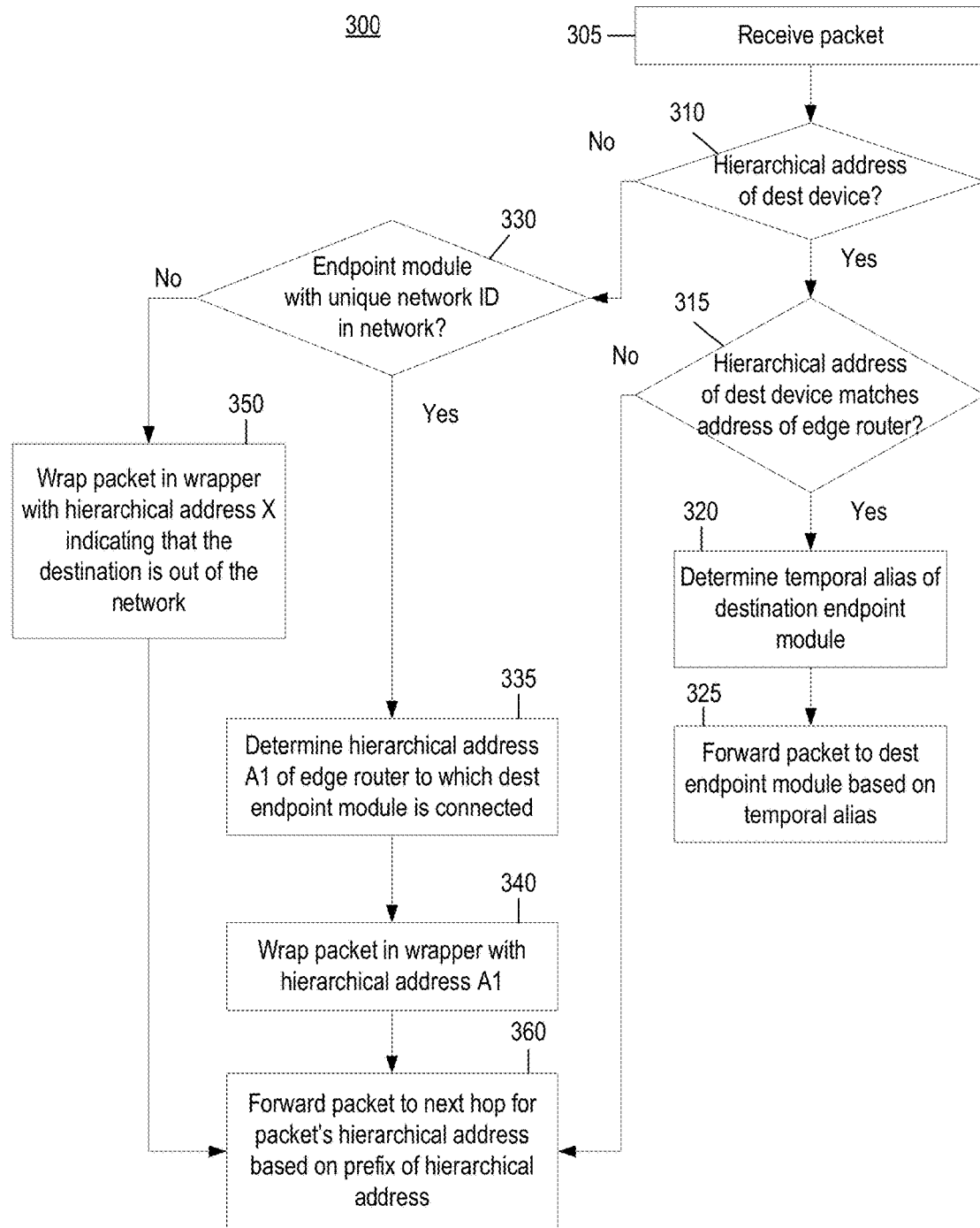
FIG. 3 is a flowchart illustrating a routing method performed by an edge router of a hierarchical recursive network, according to some embodiments.

Referring to FIG. 3, an edge router 210 may perform a routing method 300 to route packets in a hierarchical recursive network. At step 305, the edge router receives a packet. The edge router may receive the packet from an endpoint module 150 connected to the edge router, or from a core router 220 connected to the edge router. In some embodiments, the edge router may determine whether it received the packet from an endpoint module 150 or from a core router, and may store data indicating which type of device provided the packet to facilitate further processing of the packet. For example, the edge router may determine which type of device provided the packet based on which port received the packet (e.g., because the edge router may have access to data indicating which of its ports are connected to endpoint modules and which of its ports are connected to core routers), based on the packet's type (e.g., because endpoint modules generally send network layer packets addressed to unique network IDs, whereas core routers generally send hierarchical recursive routing packets addressed to hierarchical addresses in the network.

At step 310, the edge router determines whether the packet includes a hierarchical address of a destination device in the network. In some embodiments, the edge router makes this determination by examining the contents of the packet. For example, the packet's type may indicate whether the packet contains a hierarchical address. In some embodiments, the edge router makes this determination based on which type of device sent the packet. For example, the edge router may determine that packets received from core routers include hierarchical addresses of destination devices, and that packets received from endpoint modules do not include such addresses.

At step 315, having determined that the packet includes a hierarchical address of a destination device, the edge router determines whether it is the destination device (e.g., by looking up the hierarchical address of the destination device in a routing table and determining that the packet's destination address matches the table entry for the edge router's own address.

If the packet's destination address matches the address of the edge router, the edge router proceeds to step 320. At step 320, the edge router extracts the unique network ID of the destination endpoint module from the packet and determines the temporal alias (hierarchical address) of the destination endpoint module. Alternatively, if a valid temporal alias is not currently assigned to the unique network ID of the destination endpoint module, the edge router assigns the endpoint module's temporal alias, and the edge router adds an entry to its routing table, such that the entry maps the temporal alias of the endpoint module to an edge router port to which the endpoint module is connected.

At step 325, the edge router forwards the packet to the endpoint module. To perform this forwarding operation, the edge router may look up the temporal alias of the endpoint module (or the suffix thereof) in the routing table, identify the edge router port connected to the endpoint module based on the data in the matching entry in the routing table, and forward the packet to the endpoint module via the identified port.

Returning to step 310, if the packet does not include the hierarchical address of a destination device in the network, the edge router proceeds to step 330. At step 330, the edge router extracts a unique network ID of the destination device from the packet and determines whether an endpoint module having that network ID is in the network. In some embodiments, the edge router makes this determination by querying the network registrar to determine whether an endpoint module having that network ID has registered on the network.

If the destination endpoint module is not registered on the network, the edge router proceeds to step 350. At step 350, the edge router prepares to route the packet outside the hierarchical network. For example, the edge router may wrap the packet in a wrapper with a special hierarchical address ("X") indicating that destination endpoint module is outside the network. At step 360, the edge router forwards the packet to the next hop for the packet's destination address, based on a prefix of the destination address. In the scenario in which the destination address is the special hierarchical address X, the edge router forwards the packet to a core router in the second routing level, and the core routers recursively forward the packet to a gateway 125 for routing outside the network. As described above, the edge router may use a routing table to identify one or more potential next hops along the packet's route, and may use any suitable criteria to select the next hop if the routing table identifies multiple potential next hops.

Returning to step 330, if the destination endpoint module is registered on the network, the edge router proceeds to step 335. In this scenario, the edge router has received the packet from an endpoint module connected to the edge router, and in steps 335, 340, and 360, the edge router prepares the packet for routing through the hierarchical recursive network 140 and forwards the packet to the next hop on its route toward the destination endpoint module.

More specifically, at step 335, the edge router determines the hierarchical address of the edge router to which the destination endpoint module is connected. In some embodiments, the edge router makes this determination by querying the network registrar for the address of the edge router with which the destination endpoint module is registered. At step 340, the edge router wraps the packet in a wrapper with the address of the edge router to which the destination endpoint module is connected. At step 360, the edge router forwards the packet to the next hop for the packet's destination address, based on a prefix of the destination address. In the scenario in which the destination address is the address of the edge router to which the destination endpoint module is connected, the source edge router forwards the packet to a core router in the second routing level, and the core routers recursively forward the packet to the destination edge router. As described above, the edge router may use a routing table to identify one or more potential next hops along the packet's route, and may use any suitable criteria to select the next hop if the routing table identifies multiple potential next hops.

Figure 4:
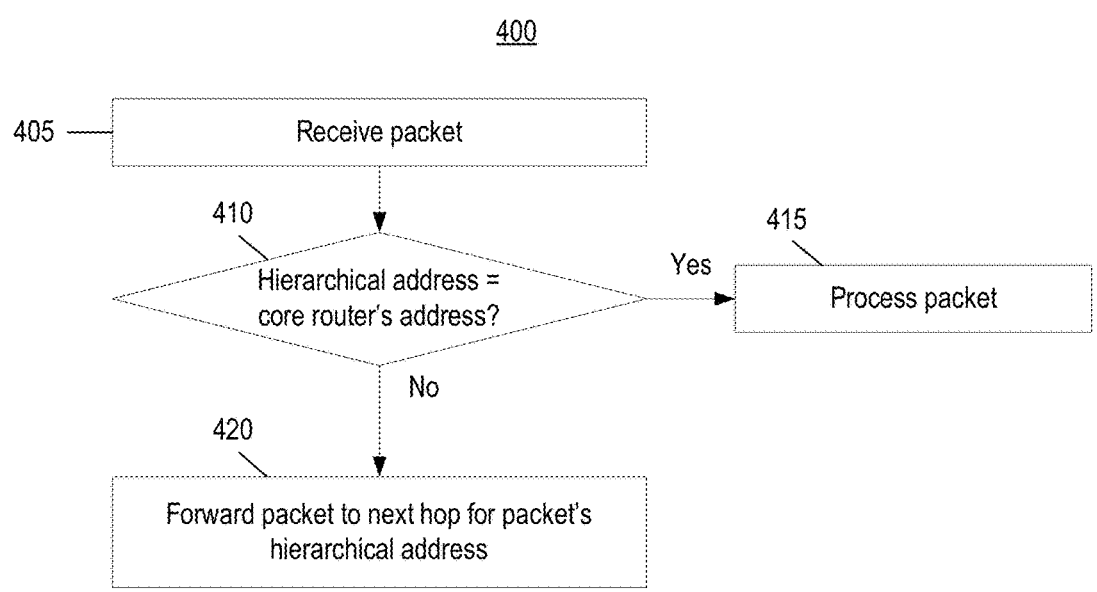
FIG. 4 is a flowchart illustrating a routing method performed by a core router of a hierarchical recursive network, according to some embodiments.

Referring to FIG. 4, a core router (220, 230) may perform a routing method 400 to route packets in a hierarchical recursive network. At step 405, the core router receives a packet. The core router may receive the packet from a gateway 125 connected to the network, from another core router, or from an edge router. In some embodiments, the core router may determine whether it received the packet from (1) a gateway, or (2) a core router or edge router.

In the latter case, the core router simply proceeds to step 410. In the former case, the core router may extract the unique network ID of the destination endpoint module from the packet and query the network registrar to determine whether the unique network ID is registered on the network, and if so, to identify the hierarchical address of the edge router to which the destination endpoint module is connected. The core router may then wrap the packet in a wrapper having its destination address set to the hierarchical address of that edge router. The core router then proceeds to step 410.

At step 410, the core router determines whether destination address of the packet is the core router's address. If so, the core router processes the packet at step 415. Otherwise, the core router proceeds to step 420. At step 420, the core router forwards the packet to the next hop on its route to the destination endpoint module based on the packet's hierarchical address. As described above, the core router may use a routing table to identify one or more potential next hops along the packet's route, and may use any suitable criteria to select the next hop if the routing table identifies multiple potential next hops.

Figure 5:
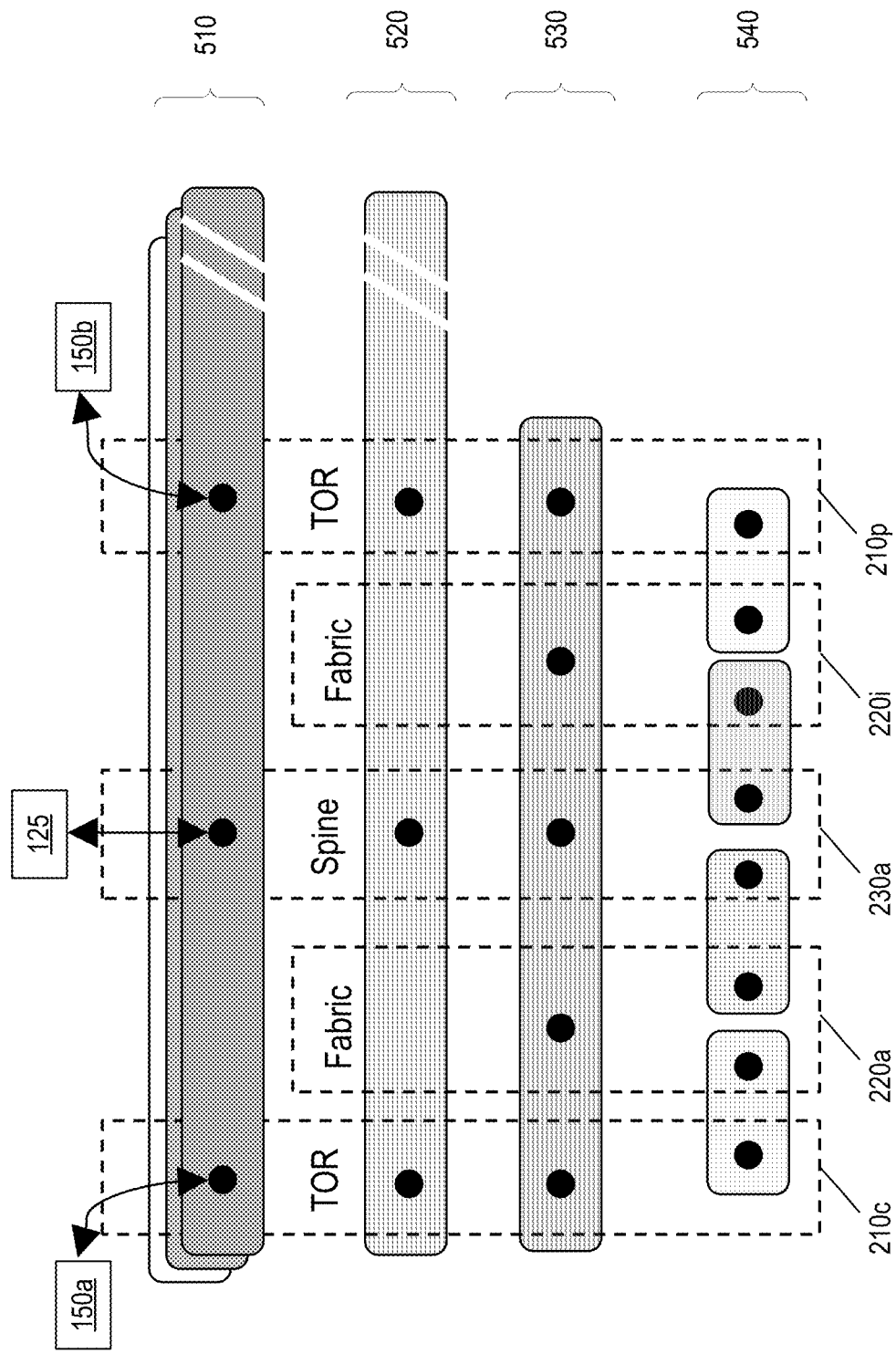
FIG. 5 is a schematic of an example implementation of the hierarchical recursive network of FIG. 2, suitable for routing packets in a data center, according to some embodiments.

In some embodiments, the hierarchical recursive network 140 can be used to perform packet routing in a datacenter. Referring to FIG. 2, the edge routers 210 can be top-of-rack switches (TORs), the core routers 220 can be fabric switches, and the core routers 230 can be spines. The endpoint modules 150 can be servers or applications executing on servers (e.g., virtual machines). FIG. 5 further illustrates how logical network constructs that may be beneficial in the datacenter environment can be implemented using the hierarchical recursive network 140 of FIG. 2. In the example of FIG. 5, the vertical structures in dashed lines represent routing devices. In particular, the edge router 210*c* is implemented using a TOR (which is connected to the endpoint module 150*a*), the core router 220*a* connected to the edge router 210c is implemented using a fabric switch, the core router 230a connected to the core router 220a is implemented using a spine, the core router 210i connected to the core router 230a is implemented using another fabric switch, and the edge router 210p connected to the core router 210i is implemented using another TOR (which is connected to the endpoint module 150b).

In the example of FIG. 5, the horizontal structures 510-540 represent logical network constructs that may facilitate communication in the datacenter. In particular, the network constructs include multiple service/tenant inter-process communication (IPC) fabrics 510 (e.g., one service/tenant IPC fabric per service/tenant of the datacenter), an inter-datacenter IPC fabric 520 (connecting two or more datacenters), an intra-datacenter IPC fabric 530 (e.g., one intra-datacenter IPC fabric per physical datacenter), and multiple shim IPC data fabrics 540 (e.g., reduced broadcast domains within a physical datacenter).

Figure 6:
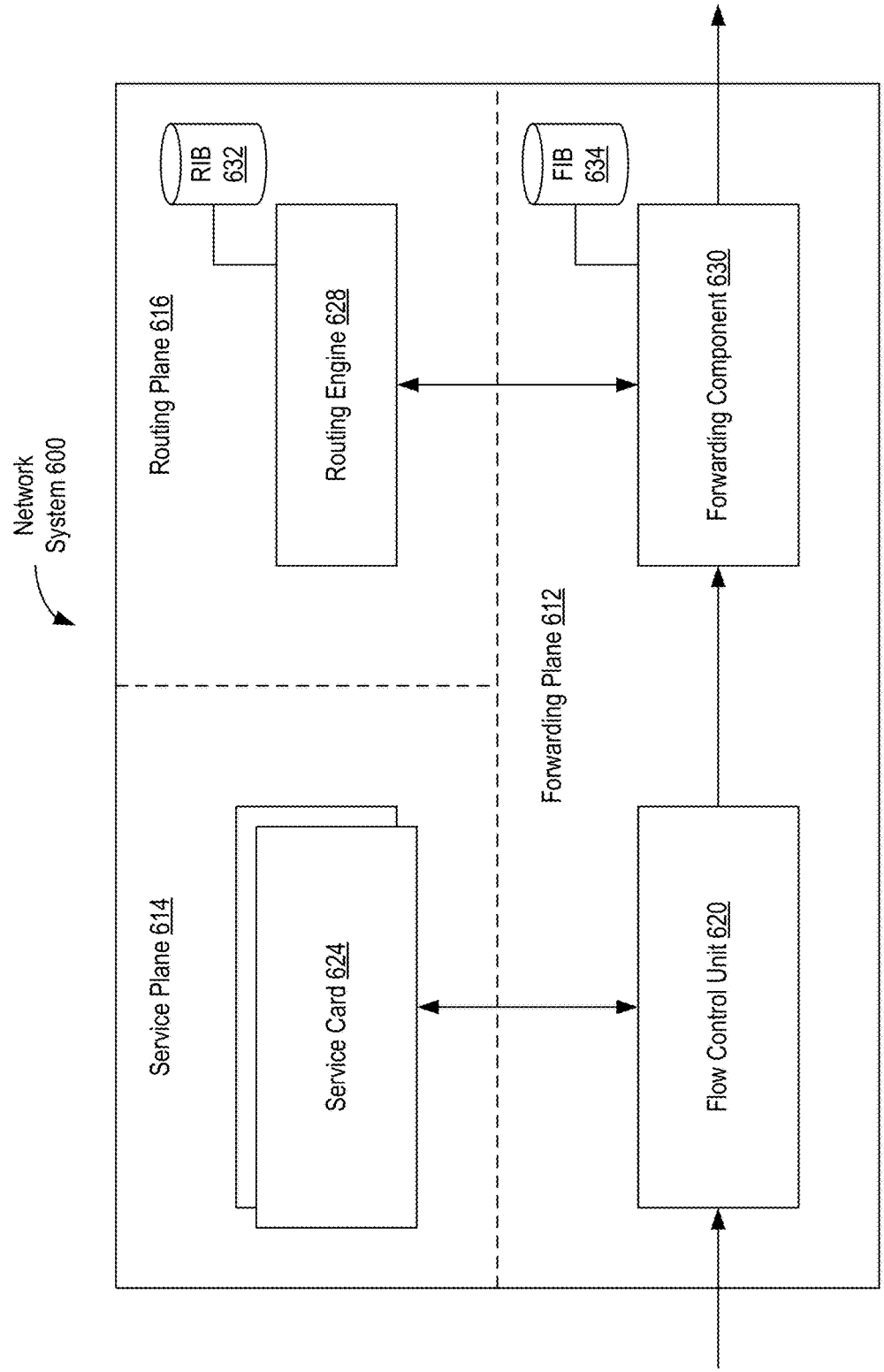
FIG. 6 is a block diagram of a network system, according to some embodiments.

Referring to FIG. 6, a network system 600 is shown. The gateways (115, 125), edge routers 210, and/or core routers (220, 230) of FIGS. 1 and 2 may be implemented, for example, using embodiments of the network system 600.

The network system 600 provides a forwarding plane 612, a routing component (routing plane 616), and a servicing component (service plane 614) to provide for packet servicing and forwarding by the network system. Network system 600 may, for example, be a high-end router capable of deployment within a service provider network or datacenter. Moreover, forwarding plane 612 may be provided by dedicated forwarding integrated circuits, may be distributed (e.g., over a multi-stage switch fabric, such as a 3-stage Clos switch fabric, or over a multi-chassis router), and may accommodate processing related to pure routing as well as other network services (e.g., firewall and deep packet inspection processing). Together, routing plane 616 and forwarding plane 612 may operate as a high-end router.

In some embodiments, the network system 600 is distributed, such that two or more of the forwarding plane 612, servicing plane 614, and routing plane 616 are implemented on using different devices, rather than being integrated in the same device. In some embodiments, each edge router 210 and core router (220, 230) may implement a forwarding plane 612, and the servicing plane and routing plane may be located remotely from the forwarding plane. In some embodiments, a network system 600 may include one or more routing planes 612 (or routing engines 628) per forwarding plane 612 (or forwarding component 630). Separating the planes in this manner may reduce the computational burden on the edge and core routers, thereby enhancing the speed and efficiency of the network.

Alternatively, the servicing plane 614 may be tightly integrated within the network device (e.g., by way of service cards) so as to use forwarding plane 612 of the routing components in a shared, cooperative manner. In some embodiments, the servicing plane may perform security operations on packets sent to the service plane 614 by the flow control unit 620. For example, when a packet of an incoming packet flow is received by network device 600 (e.g., via an interface card 794 of the network device 600) and injected into the forwarding plane 612 normally used for packet routing, the flow control unit 620 of forwarding plane 612 may analyzes the packet and determine based on the analysis whether to (1) send the packet through one or more service cards 624 of the service plane 614 or (2) send the packet directly to the forwarding component 630.

Service cards 624 within security plane 614 may be installed along a backplane or other interconnect of network device 600 to perform a variety of types of processing to packets, such as Intrusion Detection and Prevention (IDP) analysis, virus scanning, deep packet inspection, or ciphering. In some embodiments, service cards 624 may provide application layer gateway (ALG) and protocol proxy software applications, e.g., for Voice over IP (VoIP) call setup.

A service card 624 may issue commands for dynamic installation of filters into a flow table/removal of filters from the flow table (not shown) within flow control unit 620 of forwarding plane 612. When a packet is processed by forwarding component 630, forwarding component 630 may apply an appropriate action according to a dynamic filter that matched the packet. Exemplary actions that network device 600 may apply in forwarding plane 612 as specified by filters include rate limiting, queuing, routing, firewalling (i.e., blocking or dropping the packet), counting, network address translation (NAT), quality of service (QoS), sequence number adjustment, or other types of actions.

In this manner, actions typically performed by a security device and actions typically performed by a router can be combined in an integrated manner within the shared forwarding plane 612 to streamline packet forwarding in network device 600. Alternatively, in some embodiments, the service plane 614 may not be included in the network device 600.

Network device 600 includes a routing engine 628 that provides a routing plane 616 and a downstream forwarding component 630 within forwarding plane 612. Routing engine 628 is primarily responsible for maintaining a routing information base (RIB) 632 to reflect the current topology of the network (e.g., network 140) and other network entities to which network device 600 is connected. For example, routing engine 628 may provide an operating environment for execution of routing protocols that communicate with peer routers and periodically update RIB 632 to accurately reflect the topology of the network and the other network entities.

In accordance with RIB 632, forwarding component 630 maintains forwarding information base (FIB) 634 that associates network destinations (e.g., hierarchical network addresses or prefixes thereof) with specific next hops and corresponding interface ports of output interface cards of network device 600. Routing engine 628 may process RIB 632 to perform route selection and generate FIB 634 based on selected routes. When forwarding a packet, forwarding component 630 traverses the routing table of the network device 600 based on information (e.g., a hierarchical network address of a destination endpoint module, or a prefix thereof) within a header of the packet to ultimately select a next hop and output interface to which to forward the packet.

Figure 7:
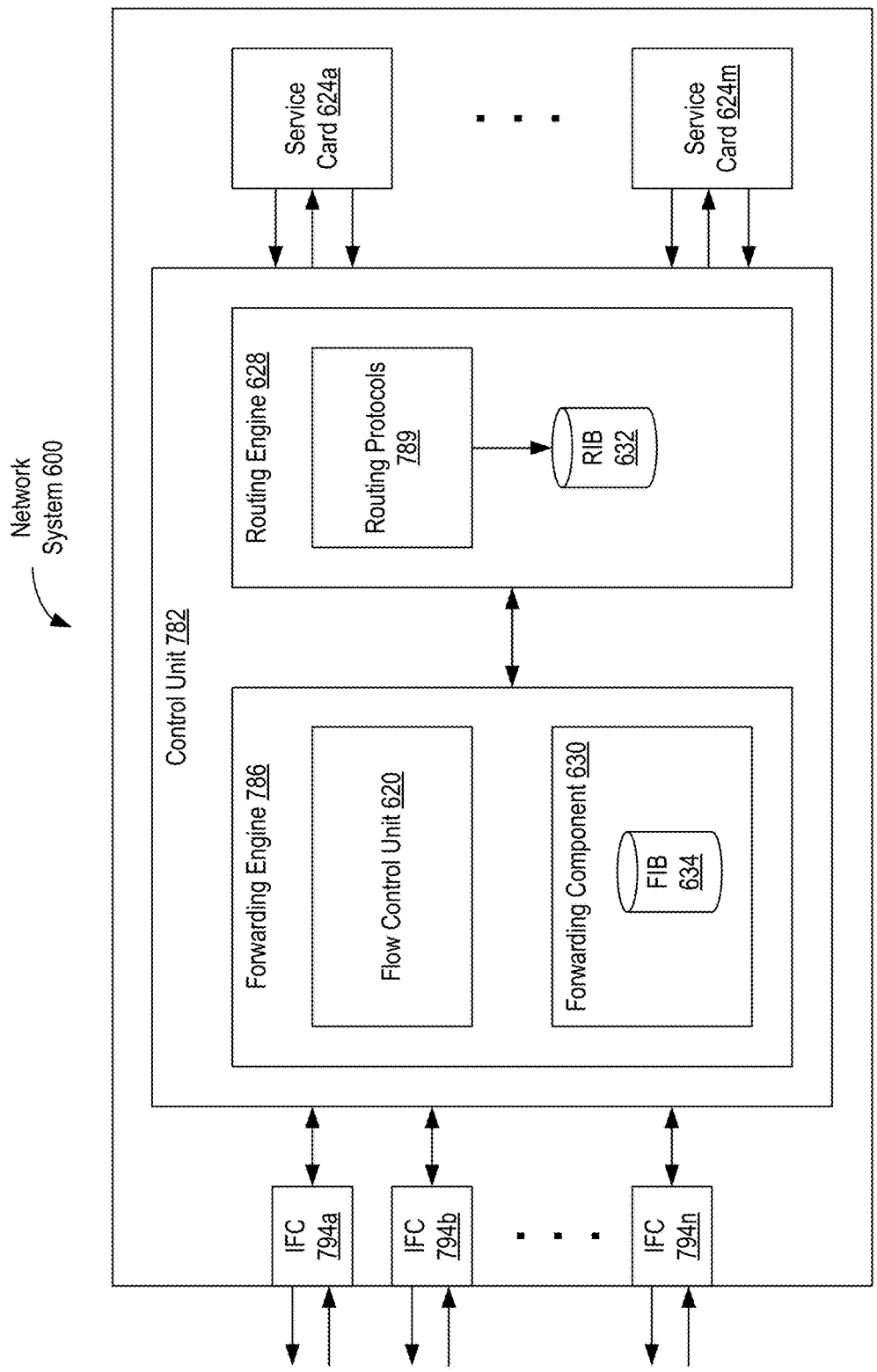
FIG. 7 is another block diagram of the network system of FIG. 6, according to some embodiments.

Referring to FIG. 7, logical components of the network device 600 are shown to illustrate the logical interaction between modules regardless of the underlying physical implementation. The network device 600 may include a control unit 782 that includes a routing engine 628 and a forwarding engine 786. As described above, the routing engine 628 is primarily responsible for maintaining routing information base (RIB) 632. Routing engine 628 also includes routing protocols 789 that perform routing operations. In accordance with RIB 632, forwarding component 630 of forwarding engine 786 maintains forwarding information base (FIB) 634 that associates network destinations (e.g., hierarchical network addresses or prefixes thereof) with specific next hops and corresponding interface ports.

Network device 600 includes interface cards 794a-794n ("IFCs 794") that receive and send packets via network links. IFCs 794 may be coupled to the network links via a number of interface ports. Generally, flow control unit 620 of forwarding engine 786 may relay certain packets received from IFCs 794 to service cards 624a-624m ("service cards 624") in accordance with filter settings. Service cards 100 may receive packets from flow control unit 620, selectively provide services in accordance with information within the packet, and relay the packet or any response packets to control unit 782 for forwarding by forwarding component 630.

In one embodiment, each of forwarding engine 786 and routing engine 628 may include one or more dedicated data processing apparatus and may be communicatively coupled by a data communication channel. The data communication channel may be a high-speed network connection, bus, shared-memory or other data communication mechanism. Forwarding engine 786, routing engine 628, or both, may make use of the data structures and organization described above with respect to FIG. 6. For example, routing plane 616 of FIG. 6 may correspond to routing engine 628, forwarding plane 612 of FIG. 6 may correspond to forwarding engine 786, and interface cards 794 and service plane 14 of FIG. 1 may correspond to service cards 624.

Network device 600 may further include a chassis (not shown) for housing control unit 782. The chassis has a number of slots (not shown) for receiving a set of cards, including IFCs 794 and service cards 624. Each card may be inserted into a corresponding slot of the chassis for electrically coupling the card to control unit 782 via a bus, backplane, or other electrical communication mechanism.

Service cards 624 may relay processed packets or reply packets to control unit 782. Control unit 782 may forwards the packet in accordance with FIB 634. The forwarding component 630 may apply one or more actions to packets relayed to the forwarding component 630 by control unit 782, as specified by matching filters. For example, forwarding component 630 may perform rate limiting, queuing, packet mirroring, routing, firewalling (i.e., blocking or dropping the packet), counting, logging, network address translation (NAT), sequence number adjustment, quality of service (QoS), or other types of actions.

The functions of network device 600 may be implemented by executing, with one or more data processing apparatus, instructions fetched from a computer-readable storage medium. The term "data processing apparatus" encompasses all kinds of apparatus, devices, and machines for processing data, including by way of example a programmable processor (e.g., a general or special purpose microprocessor), a system on a chip, or multiple ones or combinations, of the foregoing. The apparatus can include special purpose logic circuitry, e.g., an FPGA (field programmable gate array) or an ASIC (application specific integrated circuit). Generally, a processor will receive instructions and data a computer-readable storage medium. Examples of such media include random access memory (RAM), read-only memory (ROM), non-volatile random access memory (NVRAM), electrically erasable programmable read-only memory (EEPROM), flash memory, and the like.

An endpoint device (150, 160) may include a computer, which may include one or more data processing apparatus for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in an endpoint device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Further Description of Some Embodiments

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or other non-transitory storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for hierarchical topological addressing and hierarchical recursive routing in a network, the system comprising:

a plurality of routing devices operating in two or more routing layers below a network layer in a network protocol stack, wherein within each routing layer a respective group of the routing devices are organized in a respective hierarchical topology, each topology including a plurality of levels, the levels including at least a first level and a second level, the first level including a first subset of the respective group of routing devices, the second level including a second subset of the respective group of routing devices, each routing device in the first level being directly connected to one or more routing devices in the second level, each routing device in the hierarchical topology having a hierarchical address in an address space of the respective routing layer, the hierarchical address corresponding to a respective location of the respective routing device within the hierarchical topology corresponding to the respective routing layer, wherein, within the respective hierarchical topology corresponding to each layer, the hierarchical address of each routing device in the first level includes the hierarchical address of a corresponding routing device in the second level, wherein each of the routing devices is operable to perform recursive one-hop routing to route packets through the network via the two or more routing layers based on prefixes of destination addresses of the packets.

2. The system of claim 1, wherein the network layer is an Internet Protocol (IP) layer.

3. The system of claim 1, wherein at least one of the routers is connected to a first endpoint module operable to establish a network connection with a second endpoint module in the network layer, and packets routed between the first and second endpoint modules are routed through the network via the recursive one-hop routing.

4. The system of claim 3, wherein the first and second endpoint modules establish the network connection in the network layer using a first unique network identifier (ID) of the first endpoint module and a second unique network identifier (ID) of the second endpoint module.

5. The system of claim 4, wherein a first particular routing device in the first level of the hierarchical topology corresponding to a first routing layer is directly connected to the first endpoint module prior to the network connection being established, wherein the first particular routing device assigns a hierarchical address in the address space of the first routing layer to the first endpoint module prior to the network connection being established, wherein a second particular routing device changes the hierarchical address of the first endpoint module in the address space of the first routing layer after the network connection is established, and wherein the network maintains the network connection without interruption before and after the change in the hierarchical address of the first endpoint module.

6. The system of claim 1, further comprising a gateway device operable to route packets between the network and one or more external networks, wherein the gateway device uses unique network identifiers (IDs) in the network layer to route the packets.

7. The system of claim 6, wherein the unique network IDs are Internet Protocol (IP) addresses and/or media access control (MAC) addresses.

8. The system of claim 1, wherein each routing device implements a network forwarding plane and communicates with one or more remote network routing planes.

9. The system of claim 8, wherein each routing device further communicates with one or more remote network service planes.

10. The system of claim 1, wherein the routing devices in the hierarchical topology corresponding to a particular routing layer autonomically reassign the hierarchical addresses to themselves in response to a change in the hierarchical topology of the routing devices corresponding to the particular routing layer.

11. The system of claim 1, wherein, within the respective hierarchical topology corresponding to each layer, the hierarchical address of each routing device in the first level includes the hierarchical address of the corresponding routing device in the second level as a prefix.

12. A method for hierarchical topological addressing and hierarchical recursive routing in a network including a plurality of routing devices operating in two or more routing layers below a network layer in a network protocol stack, wherein within each routing layer a respective group of the routing devices are organized in a respective hierarchical topology, each topology including a plurality of levels, the levels including a at least a first level and a second level, the first level including a first subset of the respective group of routing devices, the second level including a second subset of the respective group of routing devices, each routing device in the first level being directly connected to one or more routing devices in the second level, the method comprising:

performing, by the routing devices, recursive one-hop routing to route packets through the network via the two or more routing layers based on prefixes of destination addresses of the packets, wherein, during the recursive one-hop routing of a particular packet through a particular routing layer, the hierarchical address of each routing device in the address space of the particular routing layer corresponds to a respective location of the respective routing device within the particular hierarchical topology corresponding to the particular routing layer, and the hierarchical address of each routing device in the first level of the particular hierarchical topology includes the hierarchical address of a corresponding routing device in the second level of the particular hierarchical topology.

13. The method of claim 12, wherein the network layer is an Internet Protocol (IP) layer.

14. The method of claim 12, wherein at least one of the routers is connected to a first endpoint module operable to establish a network connection with a second endpoint module in the network layer, and wherein packets routed between the first and second endpoint modules are routed through the network via the recursive one-hop routing.

15. The method of claim 14, wherein the first and second endpoint modules establish the network connection in the network layer using a first unique network identifier (ID) of the first endpoint module and a second unique network identifier (ID) of the second endpoint module.

16. The method of claim 15, wherein a first particular routing device in the first level of the particular hierarchical topology corresponding to the particular routing layer is directly connected to the first endpoint module prior to the network connection being established, wherein the first particular routing device assigns a hierarchical address in the address space of the particular routing layer to the first endpoint module prior to the network connection being established, wherein a second particular routing device changes the hierarchical address of the first endpoint module in the address space of the particular routing layer after the network connection is established, and wherein the network maintains the network connection without interruption before and after the change in the hierarchical address of the first endpoint module.

17. The method of claim 12, wherein the network further includes a gateway device operable to route packets between the network and one or more external networks, wherein the gateway device uses unique network identifiers (IDs) in the network layer to route the packets.

18. The method of claim 17, wherein the unique network IDs are Internet Protocol (IP) addresses and/or media access control (MAC) addresses.

19. The method of claim 12, wherein each routing device implements a network forwarding plane and communicates with one or more remote network routing planes.

20. The method of claim 19, wherein each routing device further communicates with one or more remote network service planes.

21. The method of claim 12, wherein the routing devices in the particular hierarchical topology corresponding to the particular routing layer autonomically reassign the hierarchical addresses to themselves in response to a change in the hierarchical topology of the routing devices corresponding to the particular routing layer.

* * * * *